United States Patent [19]
Bladow et al.

[11] Patent Number: 5,883,799
[45] Date of Patent: Mar. 16, 1999

[54] METHOD OF OPERATING AN ELECTRONIC CONTROLLER TO OPERATE A PLURALITY OR OUTPUT DEVICES

[75] Inventors: Craig W. Bladow, Perrysburg; Steven P. Thomas, Sylvania, both of Ohio

[73] Assignee: Dana Corporation, Toledo, Ohio

[21] Appl. No.: 846,288

[22] Filed: Apr. 30, 1997

[51] Int. Cl.$^6$ ........................................ G06F 19/00
[52] U.S. Cl. ........................ 364/138; 364/140.02
[58] Field of Search ........................... 364/130, 131–138, 364/140.01, 140.1, 141–147; 307/38–41; 340/825.03, 826, 827, 825.04

[56] References Cited

U.S. PATENT DOCUMENTS

| | | | |
|---|---|---|---|
| 4,361,907 | 11/1982 | Wine ........................................ | 455/160 |
| 4,747,101 | 5/1988 | Akaiwa et al. ............................ | 370/95 |
| 4,768,220 | 8/1988 | Yoshihara et al. ........................ | 379/63 |
| 4,783,780 | 11/1988 | Alexis ....................................... | 370/95 |
| 4,930,120 | 5/1990 | Baxter et al. .............................. | 370/73 |
| 5,438,377 | 8/1995 | Chang ....................................... | 348/731 |
| 5,453,738 | 9/1995 | Zirkl et al. ...................... | 340/825.52 X |
| 5,504,939 | 4/1996 | Mayrand et al. ...................... | 455/34.1 |
| 5,572,198 | 11/1996 | Sturges ...................................... | 340/827 |

*Primary Examiner*—Joseph Ruggiero
*Attorney, Agent, or Firm*—MacMillan, Sobanski & Todd, LLC

[57] ABSTRACT

An electronic controller is operated according to a method which efficiently generates output signals to a relatively large number of output devices, yet which utilizes only a relatively small amount of programming code to accomplish this. The electronic controller is responsive to various input signals for generating output signals on a bus line to a plurality of latches, each of which contains a plurality of output lines which are connected to operate the output devices. The electronic controller initially inputs the number of output lines per latch contained in the electronic control system as a variable B. Then, the number of a selected output device (designated as a variable A) is divided by the number of output lines per latch B. The result of this division is expressed in the form of an integer C plus a remainder D. The integer C designates the latch which controls the operation of the selected output device, while the remainder D designates the specific selected output device within that latch. Thus, the electronic controller generates the appropriate output signal on the bus line to the latches.

6 Claims, 4 Drawing Sheets

METHOD OF OPERATING AN ELECTRONIC CONTROLLER TO OPERATE A PLURALITY OR OUTPUT DEVICES

BACKGROUND OF THE INVENTION

This invention relates in general to electronic controllers for controlling a plurality of output devices. In particular, this invention relates to a method for operating an electronic controller in a manner which efficiently generates output signals to a relatively large number of output devices, yet which utilizes only a relatively small amount of programming code to accomplish this.

Many industrial, commercial, and agricultural vehicles in use today are provided with one or more output or accessory devices to assist an operator of the vehicle in performing various functions, such as lifting, loading, or moving articles. For example, a typical refuse truck includes a plurality of hydraulic actuators which are connected to arms and other devices for lifting and emptying refuse receptacles and packing refuse within a container. Also, many construction vehicles, such as excavators and bulldozers, include a plurality of hydraulic actuators which are connected to shovels, buckets, and lifting arms. In the past, these various accessory devices have been manually operated by the operator of the vehicle by means of a hydraulic control system. A conventional hydraulic control system includes a source of pressurized fluid which is connected through a plurality of control valves to the various hydraulic actuators. By manually opening and closing the control valves, the operator can control the operations of the hydraulic actuators, as well as the accessory devices connected thereto, in a desired manner.

More recently, because of significant advances in electronic controller technology, many industrial, commercial, and agricultural vehicles are provided with an electronic control system for automatically performing some or all of the operations which have previously been performed manually. A typical electronic control system includes one or more electronic controllers for automatically controlling the operation of the control valves and, therefore, the various accessory devices. In a typical automated hydraulic control system, the electronic controller is responsive to one or more input signals for generating output signals to electrically operated solenoids which control the operation of the control valves. The electronic controller may, for example, control the timing and quantity of pressurized fluid supplied from the source to the hydraulic actuators so as to control the movement of the accessory devices in a desired manner. Thus, the electronic controller relieves the operator of the vehicle from many of the control operations which were previously performed manually.

Because of cost and physical constraints, the electronic controller typically provided within a vehicle for controlling the various accessory devices is embodied as a microprocessor. Generally speaking, a microprocessor is a general purpose digital computer which is relatively small in size, memory space, and computational capacity. As a result, the ability of such a microprocessors to control the operation of a plurality of accessory devices is somewhat limited. In view of this, it is important to program and operate these microprocessors in such a manner as to maximize the efficiency thereof. Thus, it would be desirable to provide a method for operating an electronic controller in a manner which efficiently generates output signals to a relatively large number of output devices, yet which utilizes only a relatively small amount of programming code to accomplish this.

SUMMARY OF THE INVENTION

This invention relates to a method for operating an electronic controller in a manner which efficiently generates output signals to a relatively large number of output devices, yet which utilizes only a relatively small amount of programming code to accomplish this. The electronic controller is responsive to various input signals for generating output signals on a bus line to a plurality of latches, each of which contains a plurality of output lines which are connected to operate the output devices. The electronic controller initially inputs the number of output lines per latch contained in the electronic control system as a variable B. Then, the number of a selected output device (designated as a variable A) is divided by the number of output lines per latch B. The result of this division is expressed in the form of an integer C plus a remainder D. The integer C designates the latch which controls the operation of the selected output device, while the remainder D designates the specific selected output device within that latch. Thus, the electronic controller generates the appropriate output signal on the bus line to the latches.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
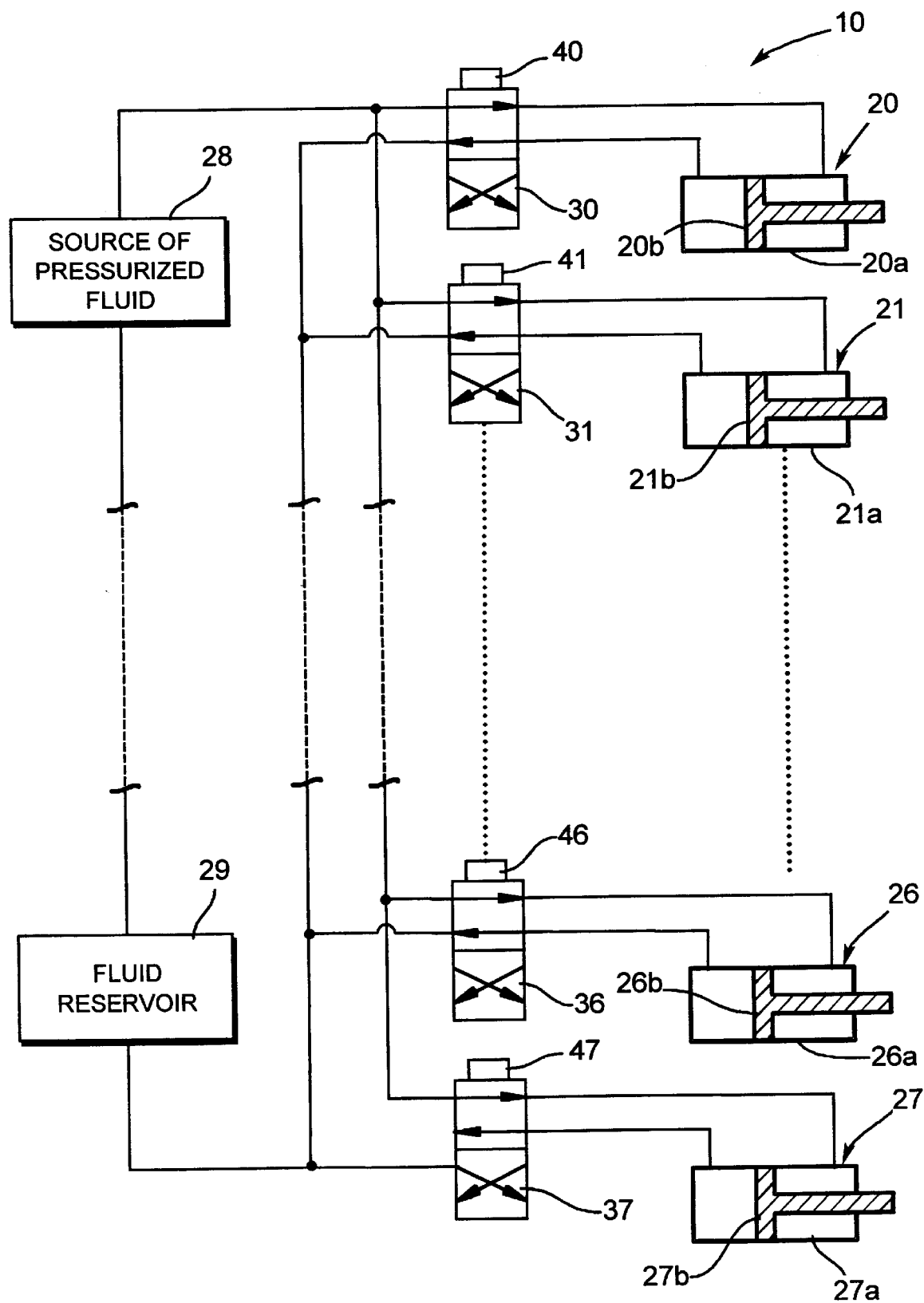
FIG. 1 is a block diagram of a hydraulic control system for controlling the operation of a plurality of accessory devices in accordance with this invention.

Referring now to the drawings, there is illustrated in FIG. 1 a block diagram of a hydraulic control system, indicated generally at 10, for controlling the operation of a plurality of accessory devices (not shown) in accordance with this invention. The illustrated hydraulic system 10 includes a plurality of hydraulic actuators. In the illustrated embodiment, eight of such hydraulic actuators, indicated generally at 20 through 27, are represented. However, the number of such hydraulic actuators 20 through 27 may be greater or lesser as desired. Each of the hydraulic actuators 20 through 27 is connected to an accessory device in a known manner. The accessory devices may be used to perform any desired function. For example, the accessory devices may be used for lifting, dumping, and compacting refuse in a refuse vehicle. Although the illustrated hydraulic actuators 20 through 27 are identical in structure and operation, some or all of the hydraulic actuators may vary in structure. Also, it will be appreciated that this invention can be employed with accessory devices which are not hydraulically actuated, such as motors and the like. Furthermore, although this invention will be described in the context of a hydraulic control system 10 for use on an industrial vehicle, it will be appreciated that this invention can be used on any other type of vehicle or in non-vehicular applications.

The hydraulic actuator 20 is conventional in the art and includes a hollow cylinder 20a having a piston 20b disposed therein. The piston 20b divides the interior of the cylinder 20a into first and second chambers. Thus, the illustrated hydraulic actuator 20 is dual-acting hydraulic actuator which is capable of moving the piston 20b in two directions relative to the cylinder 20a. The piston 20b is moved by selectively supplying pressurized fluid to and venting the first and second chambers of the cylinder 20a. To accomplish this, the first and second chambers of the cylinder 20a are connected through respective conduits to a control valve 30. The illustrated control valve 30 is a conventional two-way valve, the operation of which is controlled by a solenoid 40. When the control valve 30 is moved to a first position, a source of pressurized fluid 28 is connected therethrough to the first chamber of the cylinder 20a, while the second chamber of the cylinder 20a is vented to a fluid reservoir 29. As a result, the piston 20b is moved in a first direction relative to the cylinder 20a. Similarly, when the control valve 30 is moved to a second position by the solenoid 40, the source of pressurized fluid 28 is connected therethrough to the second chamber of the cylinder 20a, while the first chamber of the cylinder 20a is vented to the fluid reservoir 29. As a result, the piston 20b is moved in a second direction relative to the cylinder 20a. The other hydraulic actuators 21 through 27 are connected through respective control valves 31 through 37 (controlled by respective solenoids 41 through 47) to the source of pressurized fluid 28 and the fluid reservoir 29.

As discussed above, the pistons of the hydraulic actuators 20 through 27 are connected to respective accessory devices for effecting movement. For example, in the context of a refuse vehicle, the hydraulic actuator 20 can be used to move a reaching arm, the hydraulic actuator 21 can be used to move a lifting arm, the hydraulic actuator 22 can be used to move a gripping arm, the hydraulic actuator 23 can be used to move a dumping arm, the hydraulic actuator 24 can be used to move a body arm, the hydraulic actuator 25 can be used to move a tailgate arm, the hydraulic actuator 26 can be used to move a packer arm, and the hydraulic actuator 27 can be used to move a container dump mechanism. However, as mentioned above, the hydraulic control system 10 may be used to control any desired accessory or other output devices.

Figure 2:
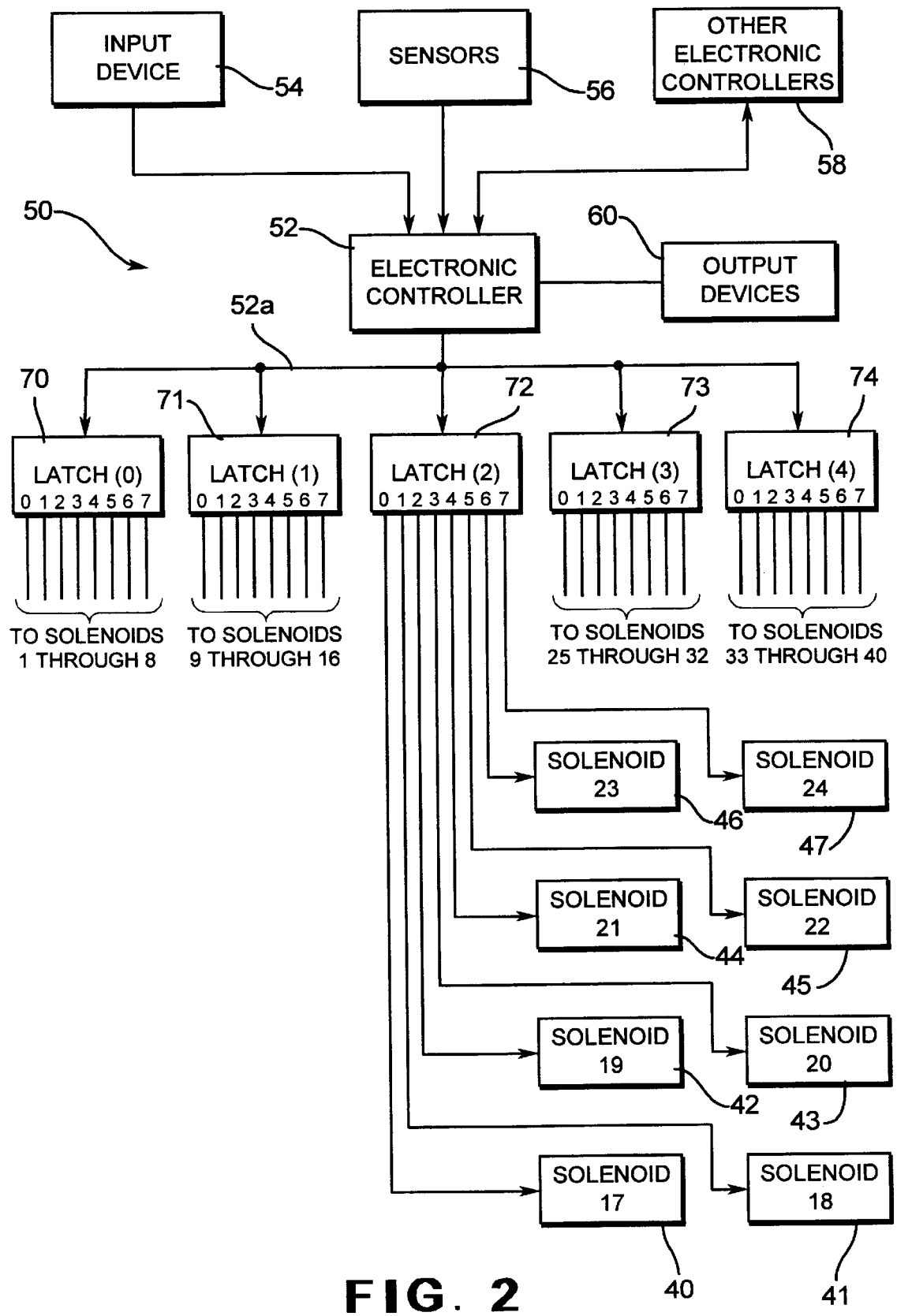
FIG. 2 is a block diagram of an electronic control system for controlling the operation of the hydraulic control system illustrated in FIG. 1.

Referring now to FIG. 2, there is illustrated a block diagram of an electronic control circuit, indicated generally at 50, for controlling the operation of the hydraulic control system 10 illustrated in FIG. 1. The electronic control circuit 50 includes an electronic controller 52 which, from a hardware standpoint, is conventional in the art. For example, the electronic controller 52 may be embodied as any general purpose digital computing apparatus. Typically, however, the electronic controller 52 is embodied as a microprocessor which, as mentioned above, is relatively small in size, memory space, and computational capacity.

The electronic control circuit 50 includes an input device 54 which is connected to the electronic controller 52. The input device 54 is conventional in the art and is adapted to generate a plurality of input signals to the electronic controller 52 which are representative of the mode of operation for the hydraulic control circuit 10 desired by the operator. For example, the input device 54 may be embodied as a keyboard or other manually operable mechanism for generating the input signals to the electronic controller 52. If desired, a plurality of such input devices 54 may be provided. The electronic control circuit 50 also includes a plurality of sensors 56 which are connected to the electronic controller 52. The sensors 56 are also conventional in the art and are adapted to generate a plurality of input signals to the electronic controller 52 which are representative of the status of various operating conditions of the hydraulic control circuit 10, the vehicle on which the hydraulic control circuit 10 is provided, or any other desired parameter. For example, the sensors 56 may include position or proximity sensors provided on the various hydraulic actuators 20 through 27 or on the accessory devices connected thereto. The sensors 56 may also include fluid pressure sensors, temperature sensors, and level sensors located throughout the hydraulic control system 10, as well as various sensors which monitor the operation of the vehicle on which the hydraulic control circuit 10 is provided. The electronic control circuit 50 may also include one or more other electronic controllers 58 which are provided on the vehicle on which the hydraulic control circuit 10 is provided. The other electronic controllers 58 are connected to communicate with the electronic controller 52 in a conventional manner. The electronic controller 52 is also connected to one or more output devices 60, such as a visual display, an audible or visual alarm, and the like, to advise the operator of the status of the hydraulic control system 10. Lastly, the electronic controller 52 may, if is desired, be connected to the source of pressurized fluid 29 so as to control the operation thereof.

The electronic controller 52 has an output bus line 52a which is connected to the inputs of a plurality of latches in a known manner. In the illustrated embodiment, five of such latches 70, 71, 72, 73, and 74 are provided. However, the number of such latches may be greater or lesser as desired. Each of the illustrated latches 70 through 74 is conventional in the art and is provided with eight output lines (which are designated as 0 through 7) which are connected to operate the solenoids or other output devices discussed above. Thus, each of the latches 70 through 74 is commonly referred to as an eight bit latch. For example, the latch 72 can be connected to operate the eight solenoids 40 through 47 shown in FIG. 1. Although the illustrated latches 70 through 74 are eight bit latches (and, therefore are each capable of operating up to eight different solenoids or other output devices), it will be appreciated that the latches 70 through 74 may have a greater or lesser number of output lines as desired. It will also be appreciated that the latches 70 through 74 can be replaced with any output control device which is capable of controlling the operation of a plurality of output devices.

The illustrated electronic control circuit 50 is capable of controlling the operation of up to forty different solenoids (five latches, eight solenoids per latch) and, therefore, up to forty hydraulic actuators and their associated accessory devices. To facilitate the explanation of the invention set forth below, these forty solenoids have been designated as Solenoid 1 through Solenoid 40 in FIG. 2. The latches 70, 71, 72, 73, and 74 are responsive to the output signals on the bus line 52a for selectively activating the forty solenoids to operate the respective control valves in a manner determined by the electronic controller 52. As is well known in the art, the electronic controller 52 is operated in accordance with a pre-programmed algorithm or code which is usually stored in an internal memory. The algorithm can be designed in any well known manner and is executed by the electronic controller 52. Basically, the algorithm is responsive to the various input signals provided from the input device 54, the sensors 56, and the other electronic controllers 58 for controlling the operation of the various accessory devices in a desired manner. To accomplish this, the electronic controller 52 generates the output signals on the bus line 52a when it is determined that one or more of the accessory devices should be actuated. The latches 70 through 74 are responsive to such output signals for actuating only the selected one or ones of the solenoids identified by the output signals from the electronic controller 52.

In order for the electronic controller 52 to specify a single one of the solenoids for actuation, the output signals on the bus line 52a have traditionally taken the form of a binary number output signal which specifies two pieces of information. The first portion of the binary number identifies which one of the latches is connected to the solenoid to be actuated. The second portion of the binary number output signal identifies which one of the solenoids within the selected latch is to be actuated. This can be represented in short hand notation as L(X), B(Y), wherein L(X) identifies which one of the latches is connected to the solenoid to be actuated and B(Y) identifies which one of the solenoids within the selected latch is to be actuated. Thus, in the illustrated embodiment, the forty solenoids can be represented as follows:

| | |
|---|---|
| Solenoid 1 | L(0), B(0) |
| Solenoid 2 | L(0), B(1) |
| Solenoid 3 | L(0), B(2) |
| Solenoid 16 | L(1), B(7) |
| Solenoid 17 | L(2), B(0) |
| Solenoid 18 | L(2), B(1) |
| Solenoid 38 | L(4), B(5) |
| Solenoid 39 | L(4), B(6) |
| Solenoid 40 | L(4), B(7) |

Thus, to specify a single one of the solenoids to be actuated as discussed above, the electronic controller 52 will generate an output signal in the form of L(X), B(Y) on the bus line 52a. In response to that output signal, only bit Y of latch X will be actuated. In this manner, the electronic controller 52 can actuate the solenoids in accordance with the algorithm.

Figure 3:
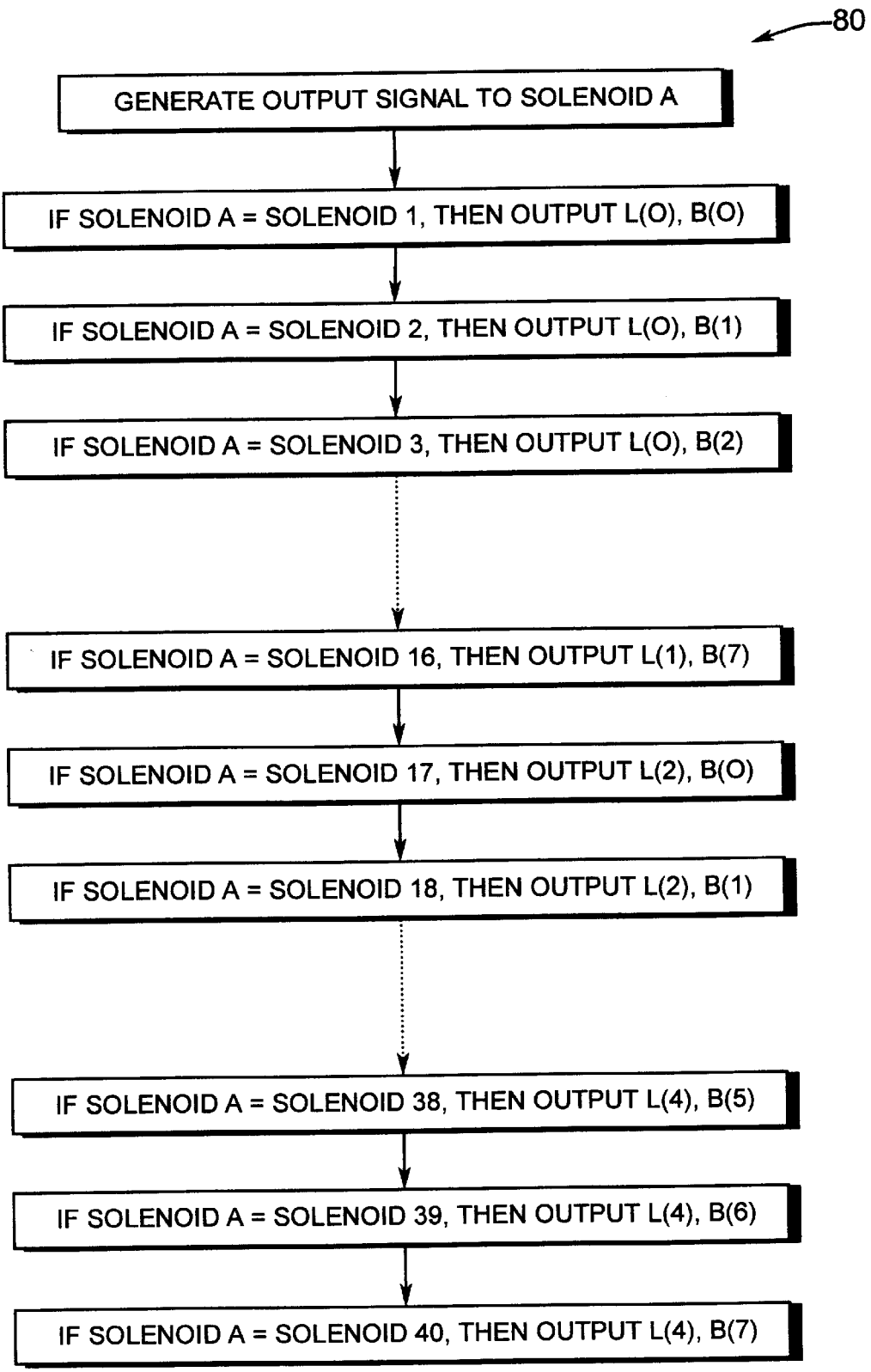
FIG. 3 is a flowchart which illustrates a subroutine of a prior art algorithm which can be executed by the electronic controller to generate the output signals on the bus line illustrated in FIG. 2.

FIG. 3 is a flowchart which illustrates a subroutine, indicated generally at 80, of a prior art algorithm which can be executed by the electronic controller 52 to generate the output signals on the bus line 52a. The portion of the prior art algorithm which precedes the illustrated subroutine 80 is conventional in the art and, therefore, has not been illustrated. Basically, however, the preceding portion of the prior art algorithm is responsive to the various input signals for determining which of the solenoids is to be actuated. Therefore, the preceding portion of the prior art algorithm is effective to generate an instruction which relates a specific action to a specific solenoid. For the purpose of explanation, let it be assumed that the prior art algorithm has determined that Solenoid 22 is to be turned on.

The first step of the illustrated subroutine 80 of the prior art algorithm is "GENERATE OUTPUT SIGNAL TO SOLENOID A", wherein A is equal to the selected solenoid (such as Solenoid 22 in this example). To translate this command into a specific output signal on the bus line 52a which is recognizable by the latches 70 through 74, the subroutine 80 then executes a lengthy series of steps to individually determine the specific output signal to be generated on the bus line 52a in response to the selected solenoid. As shown in FIG. 3, each of these steps is characterized by a case statement, i.e., an instruction which recites that if the initial portion of the statement is correct, then the action set forth in the subsequent portion of the statement should be taken. The first case statement of the subroutine 80 recites that if the selected solenoid is Solenoid 1, then the electronic controller 52 should generate output signal L(0),B(0) on the bus line 52a. Likewise, in the second case statement, if the selected solenoid is Solenoid 2, then the electronic controller 52 should generate output signal L(0),B(1) on the bus line 52a. Similar case statements are provided for each of the possible output signals to be generated on the bus line 52a. In the specific example set forth above, the subroutine 80 of the prior art algorithm would proceed through the listing of case statements until the case statement which recites that if the selected solenoid is Solenoid 22, then the electronic controller 52 should generate the appropriate output signal on the bus line 52a. To actuate Solenoid 22, therefore, the electronic controller 52 would generate the output signal L(2),B(5) on the bus line 52a. At that point, the appropriate output signal is generated on the bus line 52a, and the subroutine 80 ends.

Using this methodology, it was necessary to provide the subroutine 80 of the prior art algorithm with a separate line of code for each of the solenoids which could possibly be actuated by the electronic controller 52. Thus, in the illustrated embodiment, forty lines of code are provided in the subroutine 80 of the prior art algorithm 80 for generating the forty different output signals on the bus line 52a. In practice, however, eight or more of such latches are typically provided in the electronic control system 50. Consequently, the subroutine 80 of the prior art algorithm was quite lengthy because of the large number of case statements which were required to be provided. Although operable, the subroutine 80 of the prior art algorithm consumed an undesirably large amount of memory space within the electronic controller 52.

Figure 4:
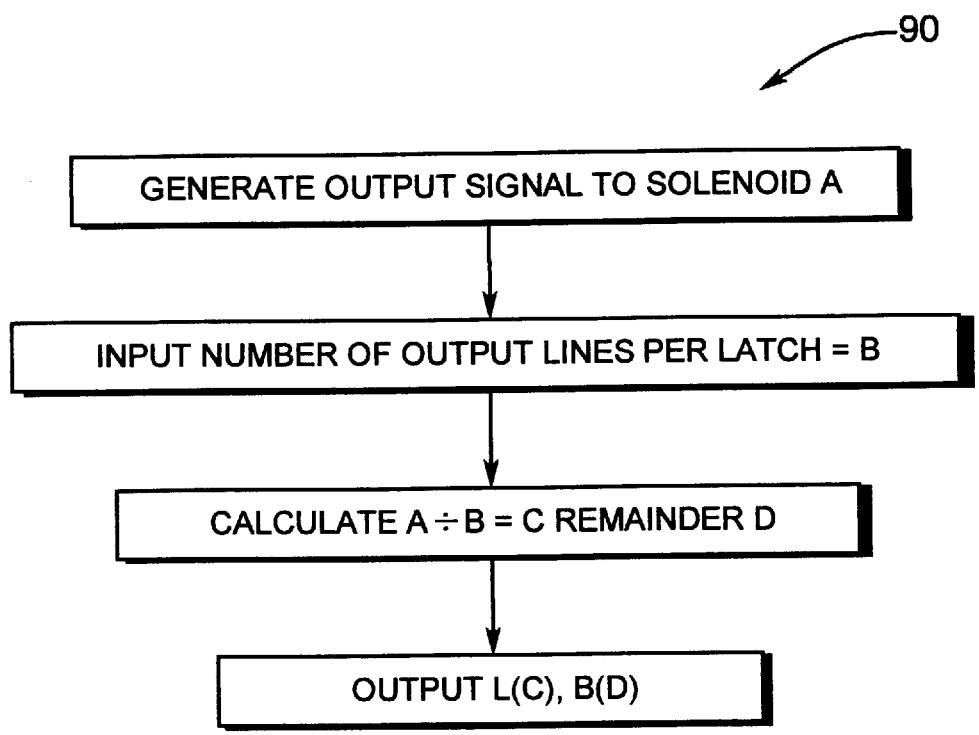
FIG. 4 is a flowchart which illustrates a subroutine of an algorithm in accordance with this invention which can be executed by the electronic controller to generate the output signals on the bus line illustrated in FIG. 2.

Referring now to FIG. 4, there is illustrated a flowchart of a subroutine, indicated generally at 90, of an algorithm in accordance with this invention which can be executed by the electronic controller 52 to generate the output signals on the bus line 52a. As above, the portion of the algorithm which precedes the illustrated subroutine 90 is conventional in the art and is effective to generate an instruction which relates a specific action to a specific solenoid. For the purpose of explanation, let it be assumed that the algorithm has again determined that Solenoid 22 is to be turned on. Thus, the first step of the subroutine 90 of this invention is also "GENERATE OUTPUT SIGNAL TO SOLENOID A", wherein A is equal to the selected solenoid (such as Solenoid 22 in this example).

To translate this command into a specific output signal on the bus line 52a which is recognizable by the latches 70 through 74, the subroutine 90 of this invention executes a short series of steps to mathematically calculate the specific output signal to be generated on the bus line 52a in response to the selected solenoid. As shown in FIG. 4, the subroutine 90 initially inputs the number of output lines per latch contained in the electronic control system 50 as a variable B. This step may be pre-preprogrammed into the electronic controller 50 earlier in the algorithm if desired. Then, the subroutine 90 enters a step in which the number of the selected solenoid A is divided by the number of output lines per latch B in the electronic control system 50. The result of this division is expressed in the form of an integer C plus a remainder D. In the illustrated embodiment, each of the five latches 70 through 74 are provided with eight output lines. Using the specific examples described and illustrated herein, the number of the selected solenoid 70 through 74 A is equal to twenty-two, while the number of latches in the electronic control system 50 B is equal to eight. As a result of this division (twenty-two divided by eight), the integer C is equal to two, and the remainder D is equal to six.

The final step of the subroutine 90 is to generate the output signal representing the latch corresponding to the integer C and the bit within that latch corresponding to the remainder D. Thus, using the specified example, the output signal L(2), B(6) would be generated on the bus line 52*a*. As shown in FIG. 2, the output signal L(2), B(6) corresponds to the selected Solenoid 22. Accordingly, the subroutine 90 of this invention is effective to quickly determine the appropriate output signal to be generated by the electronic controller 52 on the bus line 52*a*.

It will easily be appreciated that the very lengthy series of individual case statements required in the subroutine 80 of the prior art algorithm can be replaced by a very short series of instructions in the subroutine 90 of this invention. By performing the above-described mathematical calculations, the specific latch and bit can be directly accessed by the subroutine 90. It will easily be appreciated that the amount of memory space required to store the subroutine 90 of the algorithm of this invention is much smaller than the amount of memory space required to store the subroutine 80 of the prior art algorithm. Thus, the subroutine of this invention provides a method for operating the electronic controller 52 in a manner which efficiently generates output signals to a relatively large number of output devices, yet which utilizes only a relatively small amount of programming code and memory space to accomplish this.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An electronic control system comprising:

an electronic controller;

a bus line connected to said electronic controller;

a predetermined number of output control devices connected to said bus line;

a predetermined number of output lines connected to each of said output control devices; and an output device connected to each of said output lines, said electronic controller being effective to (a) generate a number which represents the selected one of said output devices to be operated, (b) divide said number of the selected output device by the number of said output lines connected to each of said output control devices to achieve an integer plus a remainder, and (c) generate a signal on said bus line to operate said output device connected to said output line represented by the remainder which is connected to said output control device represented by said integer.

2. The electronic control system defined in claim 1 wherein said electronic controller is a microprocessor.

3. The electronic control system defined in claim 1 wherein said output devices are latches.

4. The electronic control system defined in claim 1 wherein said output devices are solenoid actuated hydraulic actuators.

5. In an electronic control system including a bus line, a predetermined number of output control devices connected to the bus line, a predetermined number of output lines connected to each of the output control devices, and an output device connected to each of the output lines, a method for operating the electronic controller to operate a selected one of the output devices comprising the steps of:

(a) generating a number which represents the selected one of the output devices to be operated;

(b) dividing the number of the selected output device by the number of output lines connected to each of the output control devices to achieve an integer plus a remainder; and (c) generating a signal on the bus line to operate the output device connected to the output line represented by the remainder of said dividing step which is connected to the output control device represented by the integer of said dividing step.

6. The method defined in claim 5 wherein said steps (a), (b), and (c) are performed by an electronic controller connected to the bus line.

* * * * *